(12) United States Patent
Kim et al.

(10) Patent No.: US 10,608,285 B2
(45) Date of Patent: Mar. 31, 2020

(54) LAMINATION DEVICE

(71) Applicant: LG CHEM, LTD., Seoul (KR)

(72) Inventors: Dong Hyun Kim, Daejeon (KR);
Kyung Taek Kim, Daejeon (KR); Sang Hyun Koo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/092,717

(22) PCT Filed: Oct. 26, 2017

(86) PCT No.: PCT/KR2017/011910
§ 371 (c)(1),
(2) Date: Oct. 10, 2018

(87) PCT Pub. No.: WO2018/084491
PCT Pub. Date: May 11, 2018

(65) Prior Publication Data
US 2019/0165422 A1   May 30, 2019

(30) Foreign Application Priority Data

Nov. 4, 2016 (KR) .......................... 10-2016-0146929

(51) Int. Cl.
*B32B 37/00* (2006.01)
*H01M 10/0585* (2010.01)
(Continued)

(52) U.S. Cl.
CPC ..... *H01M 10/0585* (2013.01); *B32B 37/0053* (2013.01); *H01M 4/0433* (2013.01); *H01M 4/0435* (2013.01); *H01M 10/04* (2013.01)

(58) Field of Classification Search
CPC ......... H01M 10/0585; B30B 3/00; B30B 3/04
(Continued)

(56) References Cited

U.S. PATENT DOCUMENTS 6,568,931 B2 * 5/2003 Fujii .................. B29C 59/04
425/194
7,938,640 B2   5/2011 Yamada et al.
(Continued)

FOREIGN PATENT DOCUMENTS

JP   H06227051 A   8/1994
JP   H09044034 A   2/1997
(Continued)

OTHER PUBLICATIONS

International Search Report for PCT/KR2017/011910 dated Feb. 2, 2018.
(Continued)

*Primary Examiner* — James D Sells
(74) *Attorney, Agent, or Firm* — Birch, Stewart, Kolasch & Birch, LLP (57) ABSTRACT

A lamination device of the present invention includes a pattern roller part embodying a pattern on an electrode assembly, wherein the pattern roller part includes a rotation roller disposed on a surface of the electrode assembly to emit heat and a pattern cover wound around an outer circumferential surface of the rotation roller and partially pressing the surface of the electrode assembly together with the heat transferred from the rotation roller to embody a pattern, and the pattern cover includes a pattern film wound around the outer circumferential surface of the rotation roller and a deformation member disposed on an inner surface of the pattern film to wind the pattern film around the outer circumferential surface of the rotation roller while being deformed by the heat transferred from the rotation roller.

12 Claims, 6 Drawing Sheets

(51) Int. Cl.
*H01M 4/04* (2006.01)
*H01M 10/04* (2006.01)

(58) Field of Classification Search
USPC .......................................................... 156/581
See application file for complete search history.

(56) References Cited

U.S. PATENT DOCUMENTS

| | | | |
|---|---|---|---|
| 9,831,362 B2 * | 11/2017 | Fan | .................. H01L 31/02366 |
| 2008/0299247 A1 | 12/2008 | Ogino et al. | |

FOREIGN PATENT DOCUMENTS

| | | |
|---|---|---|
| JP | 9-315637 A | 12/1997 |
| JP | 2005-298196 A | 10/2005 |
| JP | 2006080040 A | 3/2006 |
| JP | 2008296390 A | 12/2008 |
| KR | 10-0590072 B1 | 6/2006 |
| KR | 10-2007-0010397 A | 1/2007 |
| KR | 10-0958649 B1 | 5/2010 |
| KR | 1020130033318 A | 4/2013 |
| KR | 10-2014-0007213 A | 1/2014 |
| KR | 10-1540431 B1 | 7/2015 |
| KR | 10-2016-0070411 A | 6/2016 |
| KR | 10-1627190 B1 | 6/2016 |

OTHER PUBLICATIONS

Supplementary European Search Report corresponding to European Patent Application No. 17867694.6 dated Jun. 13, 2019, 14 pages.

* cited by examiner

LAMINATION DEVICE

CROSS-REFERENCE TO RELATED APPLICATION

The present application claims the benefit of the priority of Korean Patent Application No. 10-2016-0146929, filed on Nov. 4, 2016, which is hereby incorporated by reference in its entirety.

TECHNICAL FIELD

The present invention relates to a lamination device in which a shape-memory alloy is applied to a pattern roller part for embodying a pattern on an electrode assembly.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

The secondary battery includes an electrode assembly, an electrolyte, and a case in which the electrode assembly and the electrolyte are accommodated. The electrode assembly is manufactured by alternately stacking a plurality of electrodes and a plurality of separators.

In the manufacture of the electrode assembly, a lamination process of allowing the electrode and the separator to adhere to each other. Here, a lamination device is used. That is, the lamination device includes a roller and a pattern film that is taped on a circumferential surface of the roller.

In the above-described lamination device, when the roller rotates, the roller may press the electrode assembly by using heat and a pressure, and thus, the pattern film may be bonded to be patterned between the electrode and the separator of the electrode assembly.

However, in the lamination device, the pattern film may move because a taped portion of the pattern film is gradually weakened by the heat and the pressure to cause bonding defects. Particularly, the lamination device has a problem in which the pattern film has to be taped on a circumferential surface of the roller, and thus, it takes a lot of time to perform the operation.

DISCLOSURE OF THE INVENTION

Technical Problem

The present invention has been made to solve the above-mentioned problems, and an object of the prevent invention is to provide a lamination device in which fixing force of a pattern film wound around a roller is enhanced by using a shape-memory alloy, and particularly, to provide a lamination device that is improved so that the pattern film is wound around the roller without performing separate taping.

Technical Solution

To achieve the above-described objects, a lamination device according to an embodiment of the present invention includes a pattern roller part embodying a pattern on an electrode assembly, wherein the pattern roller part includes a rotation roller disposed on a surface of the electrode assembly to emit heat and a pattern cover wound around an outer circumferential surface of the rotation roller and partially pressing the surface of the electrode assembly together with the heat transferred from the rotation roller to embody a pattern, and the pattern cover includes a pattern film wound around the outer circumferential surface of the rotation roller and a deformation member disposed on an inner surface of the pattern film to wind the pattern film around the outer circumferential surface of the rotation roller while being deformed by the heat transferred from the rotation roller.

The deformation member may have one or more opening grooves defined in the inner surface of the pattern film in a longitudinal direction.

The pattern film may include an outer film and an inner film disposed on an inner surface of the outer film and having a width less than that of the outer film, and the deformation member may be disposed in each of one or more opening grooves defined between a side portion of the inner film and the inner surface of the outer film in the longitudinal direction.

The outer film and the inner film may be thermally fused to be integrated with each other.

The outer film may have strength greater than that of the inner film.

Both ends of the pattern film, which are wound around the outer circumferential surface of the rotation roller, may be closely attached to each other without generating a gap.

One or more pattern covers may be provided in a longitudinal direction of the rotation roller.

The deformation member may be made of a shape-memory alloy material.

The rotation roller may have a support groove along the outer circumferential surface thereof, and the pattern cover may be wound around the outer circumferential surface of the rotation roller along the support groove.

The support groove may have a depth less than a thickness of the pattern cover.

The pattern roller part may be provided to correspond to each of top and bottom surfaces of the electrode assembly.

The rotation roller may emit the heat while having a temperature of 40° C. to 80° C.

Advantageous Effects

The present invention has effects as follows.

First: the lamination device of the present invention may include the pattern cover including the deformation member that is deformed by the heat. Thus, the pattern cover may be induced to be automatically wound around the rotation roller that generates heat, and thus, the working efficiency may be improved. Particularly, while the rotation roller emits heat, the fixing force of the pattern cover may be maintained, and thus, the bonding defects of the electrode assembly may be prevented from occurring.

Second: the lamination device of the present invention may have the feature in which the deformation member is provided in the opening groove defined in the pattern cover. Thus, the deformation member may be more easily attached due to the above-described feature.

Third: the lamination device of the present invention may have the feature in which the pattern cover includes the inner film and the outer film, which have widths different from each other. Thus, the opening groove for attaching the deformation member may be easily formed due to the above-described feature, and also, the deformation member may be easily attached.

Fourth: the lamination device of the present invention may have the feature in which the deformation member is made of a shape-memory alloy material. Thus, the pattern cover may be wound around the rotation roller while the deformation member is easily deformed by the heat of the rotation roller due to the above-described feature.

Fifth: the lamination device of the present invention may have the feature in which the pattern cover is wound along the support groove formed in the rotation roller. Thus, the pattern cover may be easily installed due to the above-described feature.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Lamination Device According to First Embodiment of the Present Invention

Figure 1:
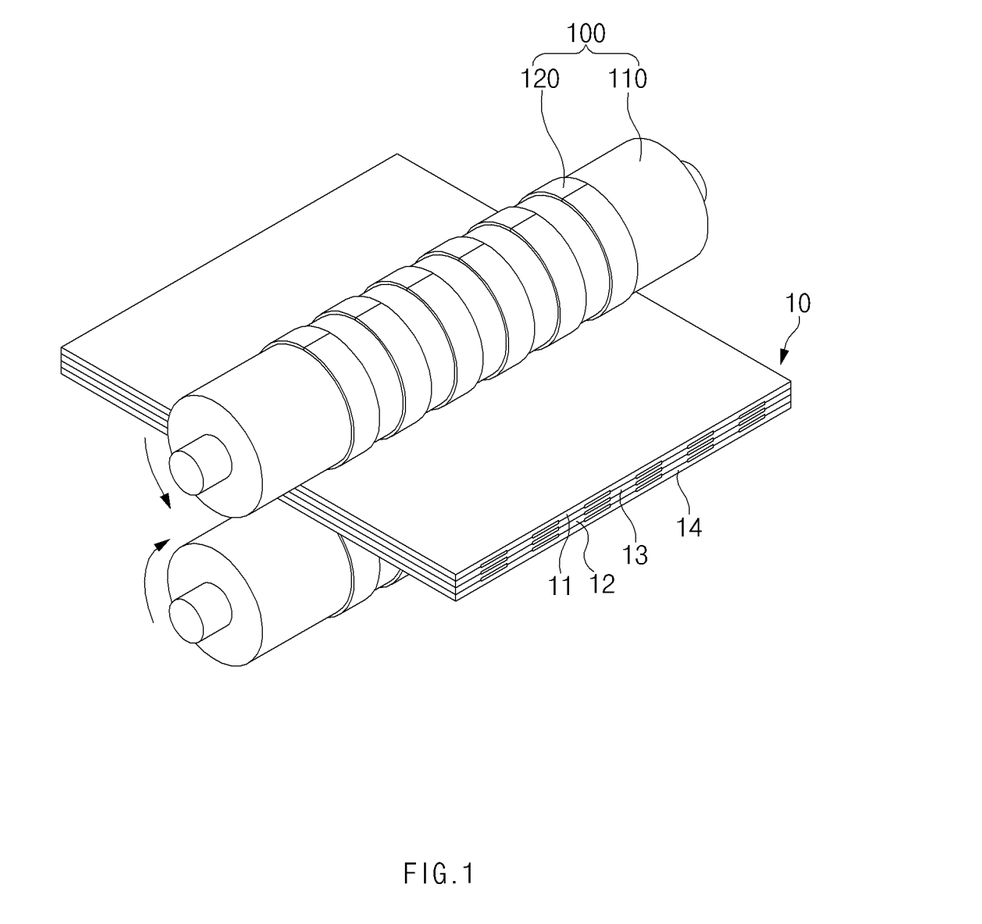
FIG. 1 is a perspective view illustrating a pattern roller part of a lamination device according to a first embodiment of the present invention.

As illustrated in FIG. 1, a lamination device according to a first embodiment of the present invention is configured to press a surface of an electrode assembly 10 by using heat and a pressure, thereby embodying a pattern. The lamination device includes a pattern roller part 100 for embodying the pattern on the electrode assembly 10.

Referring to FIG. 1, the electrode assembly 10 includes a radical unit in which a plurality of electrodes 11 and 12 and a plurality of separators 13 and 14 are alternately stacked or has a structure in which two or more radical units are stacked. Here, the plurality of electrodes 11 and 12 may be a positive electrode and a negative electrode.

Figure 2:
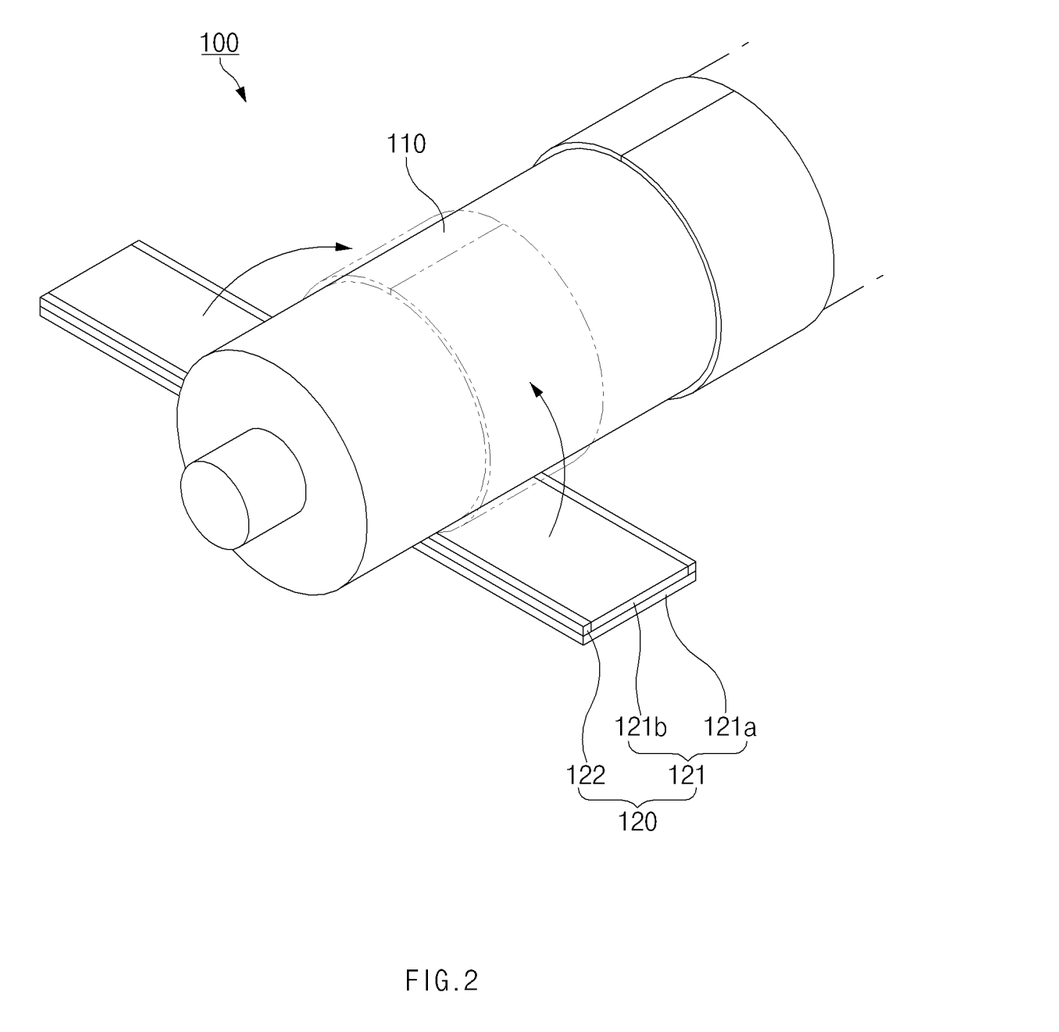
FIG. 2 is a partial enlarged perspective view of FIG. 1.

As illustrated in FIG. 2, the pattern roller part 100 is configured to embody the pattern on the electrode assembly and includes a rotation roller 110 disposed on a surface (a top surface when viewed in FIG. 1) of the electrode assembly 10 to emit heat and a pattern cover 120 that partially presses the surface of the electrode assembly 10 together with the heat transferred from the rotation roller 110 to embody the pattern.

The rotation roller 110 includes a cylindrical roller disposed in a width direction of the electrode assembly 10 and a rotation shaft disposed at a rotation center of the cylindrical roller. The rotation roller 110 emits heat while generating the heat by heat or electricity supplied from an external heating unit (not shown) or power source unit (not shown).

The pattern cover 120 is wound around an outer circumferential surface of the rotation roller 110. When the rotation roller 110 rotates, the rotation roller 110 partially presses the electrode assembly 10 to embody the pattern.

Here, the pattern cover 120 is wound around the outer circumferential surface of the rotation roller 110 without performing separate taping. Thus, easiness in work and fixing force may be improved.

Figure 3:
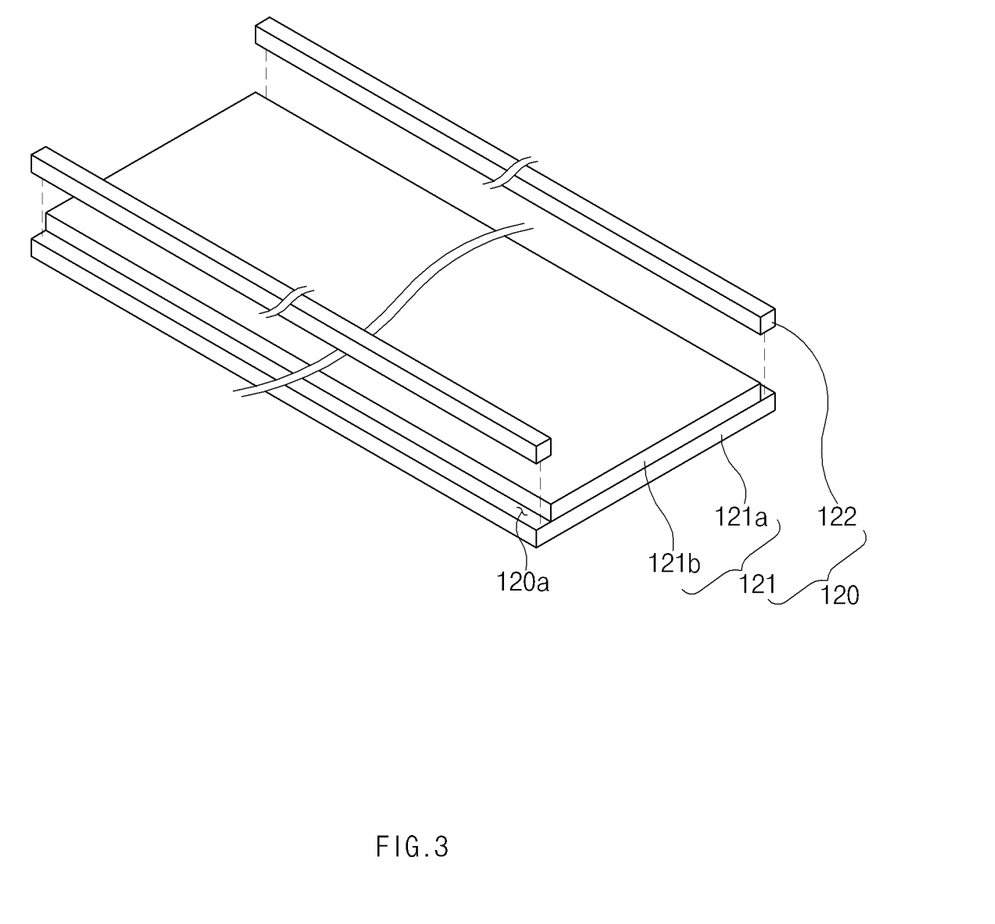
FIG. 3 is an exploded perspective view of the pattern roller part according to the first embodiment of the present invention.

For example, as illustrated in FIG. 3, the pattern cover 120 includes a pattern film 121 wound around the outer circumferential surface of the rotation roller 110 and a deformation member 122 disposed on an inner surface (a surface facing the rotation roller when viewed in FIG. 3) of the pattern film 121 to forcibly wind the pattern film 121 around the circumferential surface of the rotation roller 110 while being deformed by the heat transferred from the rotation roller 110.

That is, when the pattern cover 120 winds the pattern cover 120 around the rotation roller 110 that emits heat, the deformation member 122 may be deformed in shape from an "I" shape when viewed in FIG. 2 into a "C" shape by the heat of the rotation roller 110, and thus, the pattern film 121 may be forcibly wound around the outer circumferential surface of the rotation roller 110 by the deformed deformation member 122.

Thus, the pattern cover 120 may be wound around the rotation roller 110 without performing the separate taping. Particularly, while the rotation roller 110 emits heat, the pattern cover 120 may be always maintained in the state of being wound around the rotation roller 110 with the same force. Thereafter, if heat is not emitted from the rotation roller 110, the deformation member 122 may return to its original shape, and thus, the pattern cover 120 may be easily removed from the rotation roller 110.

As described above, the pattern cover 120 may include the deformation member 122 to improve easiness in detachment, the fixing force, and work's convenience.

Figure 4:
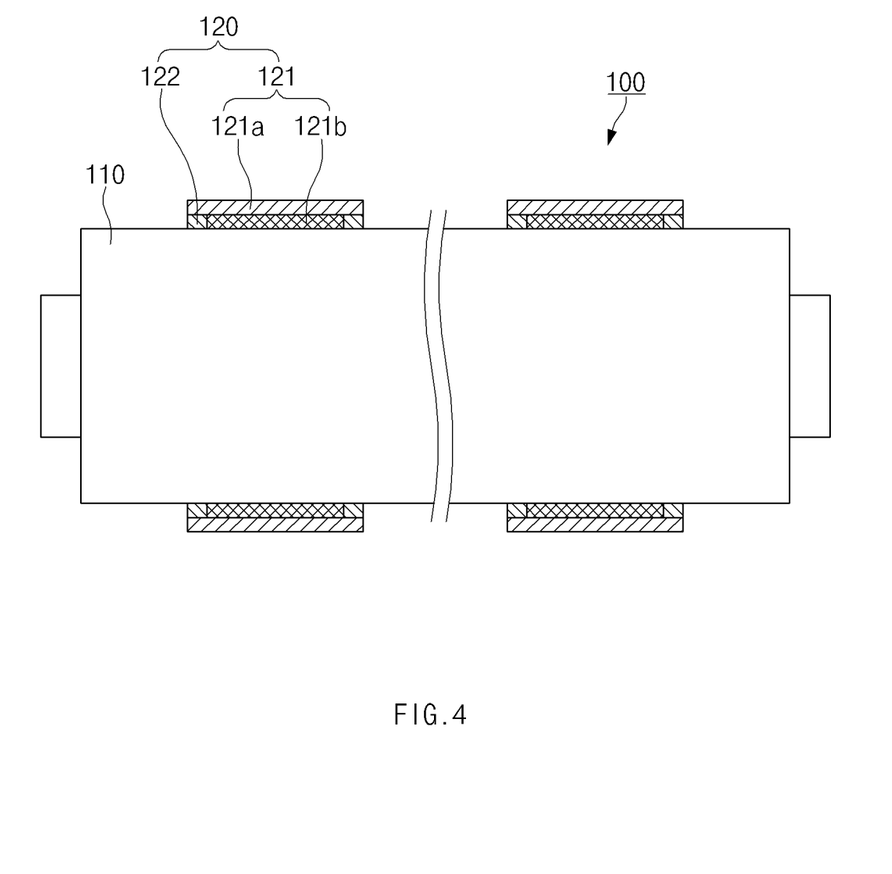
FIG. 4 is a front view of the pattern roller part according to the first embodiment of the present invention.

As illustrated in FIG. 4, the deformation member 122 may be disposed in one or more opening grooves 120a defined in a longitudinal direction in an inner surface of the pattern film 121 to match the inner surface of the pattern film 120 with the surface of the deformation member 122 at the same height. Thus, surface contact force and fixing force between the pattern cover 120 and the rotation roller 110 may increase.

Here, the opening grooves 120a are defined in both ends in the width direction in the inner surface of the pattern film 121, respectively. The deformation member 122 is disposed in each of the opening grooves 121a defined in both the ends of the pattern film 121. That is, the pattern cover 120 may be stably fixed to the rotation roller 110 only when the deformation member 122 forcibly winds both the ends of the pattern film 121 in the width direction around the rotation roller 110.

The pattern film 121 includes an outer film 121a and an inner film 121b disposed at a center on an inner surface of the outer film 121a and having a width less than that of the outer film 121a. Thus, the opening grooves 120a may be defined between a side portion of the inner film 121b and the inner surface of the outer film 121a in a longitudinal direction.

The outer film 121a and the inner film 121b may be thermally fused to be integrated with each other. Thus, a phenomenon in which the outer film 121a is separated from the inner film 121b due to an external impact may be prevented from occurring.

The outer film 121a may have strength greater than that of the inner film 121b. That is, the outer film 121a that directly presses the electrode assembly 10 may have relatively high strength to improve pressing force to the electrode assembly 10, and particularly, to minimize abrasion due to friction with the electrode assembly 10 and thereby to extend a use period. Also, the inner film 121b may have relatively low strength to significantly prevent abrasion of the rotation roller 1110 due to the inner film 121b from occurring.

Both ends of the pattern film 121 wound around the outer circumferential surface of the rotation roller 110 may be closely attached to each other without a gap. That is, if a gap occurs between both the ends of the pattern film 121 wound around the rotation roller 110, a surface of the electrode assembly 10, in which the gap occurs, may not be pressed, and thus, the pattern may not be embodied to cause defects. Thus, both the ends of the pattern film 121 may be closely attached to be coupled to each other without the gap. Here, an adhesion material (not shown) having adhesion may be applied to or injected into a portion, at which both the ends of the pattern film 121 are closely attached to each other, to seal a fine gap.

Referring to FIG. 1, one or more pattern covers 120 may be provided in the longitudinal direction of the rotation roller 110. Thus, a plurality of patterns may be easily embodied on the surface of the electrode assembly 10.

The deformation member 122 may be made of a shape-memory ally material. That is, the shape-memory alloy may be easily deformed by heat, and when the heat is removed, the shape-memory alloy may return to its original shape. Thus, the deformation member 122 may be easily deformed by the heat emitted from the rotation roller 110. Therefore, the pattern cover 120 may be more effectively wound around the outer circumferential surface of the rotation roller 110.

The rotation roller 110 may emit heat while having a temperature of 40° C. to 80° C. That is, the rotation roller 110 may have a temperature of 40° C. or more, which is higher than room temperature and a temperature of 80° C. or 80° C. or less at which the electrodes and the separators of the electrode assembly are not damaged.

Referring to FIG. 1, the pattern roller part 100 may be disposed to correspond to each of top and bottom surfaces of the electrode assembly 10 to press both surfaces of the electrode assembly 10 at the same time, thereby more effectively embodying the pattern.

In the lamination device according to the first embodiment of the present invention, the pattern cover 120 may be coupled to the outer circumferential surface of the rotation roller 110, and thus, the work's efficiency and the fixing force of the pattern cover 120 may be improved.

Hereinafter, in descriptions of a lamination device according to another embodiment of the present invention, constituents having the same function have been given with the same reference numeral in the drawings, and thus their duplicated descriptions will be omitted.

Lamination Device According to Second Embodiment of the Present Invention

Figure 5:
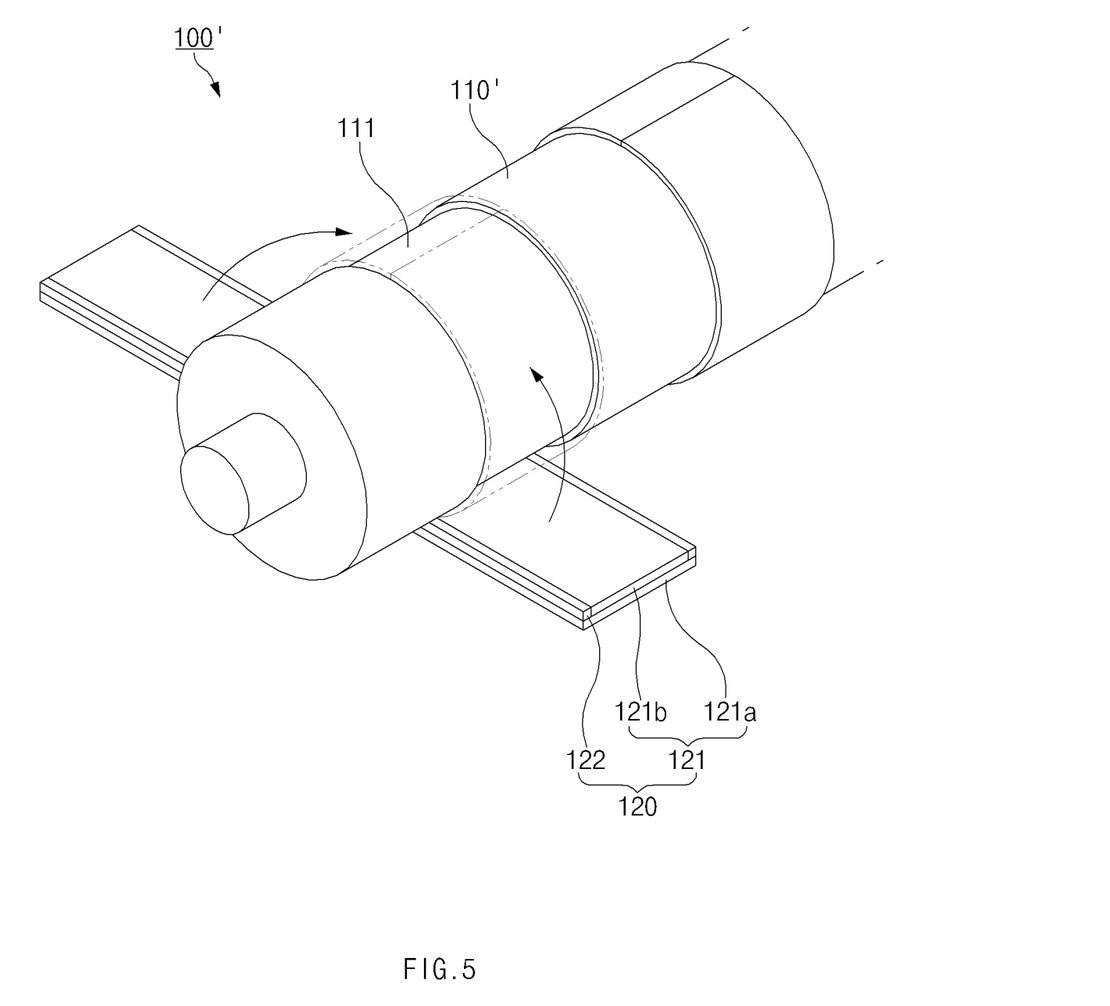
FIG. 5 is a perspective view of a pattern roller part according to a second embodiment of the present invention.
Figure 6:
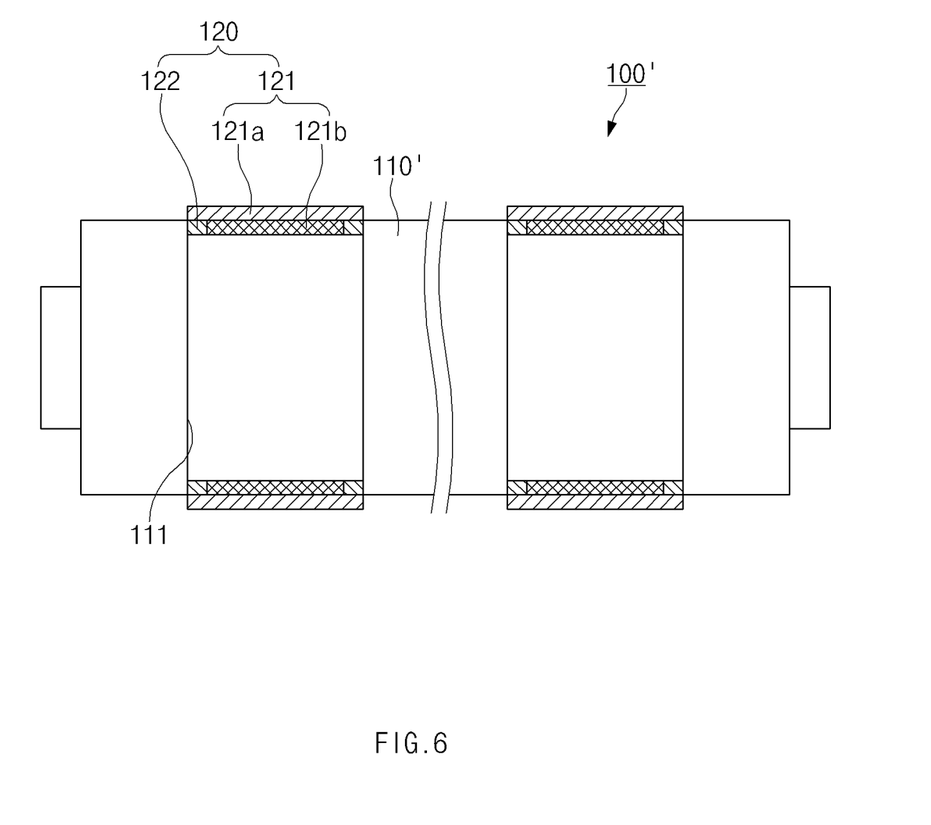
FIG. 6 is a front view of the pattern roller part according to the second embodiment of the present invention.

FIGS. 5 and 6 are views of a lamination device according to a second embodiment of the present invention.

As illustrated in FIGS. 5 and 6, a lamination device according to another embodiment of the present invention includes a pattern roller part 100' including a rotation roller 110' and a pattern cover 120 wound around the rotation roller 110'.

Here, the rotation roller 110' has a support groove 111 along an outer circumferential surface thereof, and the pattern cover 120 is wound around the outer circumferential surface of the rotation roller 110' along the support groove 111. Thus, the pattern cover 120 may be coupled to the rotation roller 110' without separate setting-up of a position to improve work's efficiency, thereby preventing the pattern cover 120 from moving in a longitudinal direction of the rotation roller 110'. Here, an adhesion material having adhesion may be applied to or injected between the support groove 111 and the pattern cover 120 to improve the fixing force of the pattern cover 120.

The support groove 111 may have a depth less than a thickness of the pattern cover 120. Thus, an outer surface of the pattern cover 120 may be exposed to the outside of the support groove 111 to more stably press a surface of an electrode assembly 10, thereby embodying a pattern.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A lamination device comprising:
a pattern roller part configured to impart a pattern on an electrode assembly,
wherein the pattern roller part comprises a rotation roller disposed on a surface of the electrode assembly to emit heat and a pattern cover wound around an outer circumferential surface of the rotation roller and partially pressing the surface of the electrode assembly together with the heat transferred from the rotation roller to impart the pattern, and
wherein the pattern cover comprises a pattern film wound around the outer circumferential surface of the rotation roller and a deformation member disposed on an inner surface of the pattern film to wind the pattern film around the outer circumferential surface of the rotation roller while being deformed by the heat transferred from the rotation roller.

2. The lamination device of claim 1, wherein the deformation member is inserted in an opening groove defined in the inner surface of the pattern film in a longitudinal direction of the pattern film.

3. The lamination device of claim 1, wherein the pattern film comprises an outer film and an inner film disposed on an inner surface of the outer film and having a width less than a width of the outer film, and
wherein the deformation member is disposed in each of one or more opening grooves defined between a corresponding side portion of the inner film and the inner surface of the outer film in a longitudinal direction of the pattern film.

4. The lamination device of claim 3, wherein the outer film and the inner film are thermally fused to be integrated with each other.

5. The lamination device of claim 3, wherein the outer film has a greater strength than a strength of the inner film.

6. The lamination device of claim 3, wherein opposite ends of the pattern film, which are wound around the outer circumferential surface of the rotation roller, are closely attached to each other without generating a gap therebetween.

7. The lamination device of claim 1, wherein one or more pattern covers are provided in a longitudinal direction of the rotation roller.

8. The lamination device of claim 1, wherein the deformation member is made of a shape-memory alloy material.

9. The lamination device of claim 1, wherein the rotation roller has a support groove along the outer circumferential surface of the rotation roller, and
    the pattern cover is wound around the outer circumferential surface of the rotation roller along the support groove.

10. The lamination device of claim 9, wherein the support groove has a depth less than a thickness of the pattern cover.

11. The lamination device of claim 1, wherein the pattern roller part is provided in plurality to correspond to each of a top surface and a bottom surface of the electrode assembly.

12. The lamination device of claim 1, wherein the rotation roller is at a temperature of 40° C. to 80° C. to emit the heat.

* * * * *